US012719686B2

(12) United States Patent
Zeng et al.

(10) Patent No.: US 12,719,686 B2
(45) Date of Patent: Aug. 25, 2026

(54) IDENTITY AUTHENTICATION METHOD, ELECTRONIC DEVICE AND COMPUTER-READABLE STORAGE MEDIUM

(71) Applicant: ZTE Corporation, Shenzhen (CN)

(72) Inventors: Ming Zeng, Shenzhen (CN); Yaofeng Tu, Shenzhen (CN); Haisheng Guo, Shenzhen (CN); Dezheng Wang, Shenzhen (CN); Hong Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 50 days.

(21) Appl. No.: 18/715,821

(22) PCT Filed: Nov. 30, 2022

(86) PCT No.: PCT/CN2022/135697
§ 371 (c)(1),
(2) Date: Jun. 3, 2024

(87) PCT Pub. No.: WO2023/098769
PCT Pub. Date: Jun. 8, 2023

(65) Prior Publication Data

US 2025/0175340 A1 May 29, 2025

(30) Foreign Application Priority Data

Dec. 2, 2021 (CN) ......................... 202111459938.6

(51) Int. Cl.
*H04L 29/06* (2006.01)
*H04L 9/00* (2022.01)
*H04L 9/32* (2006.01)

(52) U.S. Cl.
CPC .............. *H04L 9/3218* (2013.01); *H04L 9/50* (2022.05)

(58) Field of Classification Search
CPC ......... H04L 9/3218; H04L 9/50; H04L 63/08; H04L 63/0823; H04L 9/3247; H04L 9/3263
See application file for complete search history.

(56) References Cited

U.S. PATENT DOCUMENTS

2005/0144666 A1 6/2005 Blumwald et al.
2017/0302455 A1 10/2017 Abt, Jr. et al.
(Continued)

FOREIGN PATENT DOCUMENTS

CN 107846394 A 3/2018
CN 108629040 A 10/2018
(Continued)

OTHER PUBLICATIONS

Chinese Office Action; Application No. 202111459938.6; Filing Date: Dec. 2, 2021; date of mailing: Oct. 25, 2025; 12 pages.
(Continued)

*Primary Examiner* — Malcolm Cribbs
(74) *Attorney, Agent, or Firm* — CANTOR COLBURN LLP

(57) ABSTRACT

The present disclosure provides a method for identity authentication, an electronic device and a computer readable storage medium. The method for identity authentication may include: acquiring an identity proof of a user, wherein the identity proof comprises an identity attribute of the user and a Merkel root verification path, and the Merkel root verification path in the identity proof is a verification path obtained when the identity proof is generated and based on the identity attribute selected by the user to be disclosed; deducing the Merkel root verification path according to the
(Continued)

identity attribute disclosed in the identity proof; and authenticating the identity proof of the user according to the deduced verification path and a verification path in the identity proof.

18 Claims, 7 Drawing Sheets

(56) References Cited

U.S. PATENT DOCUMENTS

| | | | |
|---|---|---|---|
| 2017/0339138 A1 | 11/2017 | Lewison et al. | |
| 2020/0213296 A1 | 7/2020 | Saha et al. | |
| 2021/0051027 A1 | 2/2021 | Wang | |
| 2022/0021537 A1* | 1/2022 | Wagner | H04L 9/3218 |
| 2022/0150073 A1* | 5/2022 | Androulaki | G16H 10/60 |

FOREIGN PATENT DOCUMENTS

| | | | |
|---|---|---|---|
| CN | 109040082 | A | 12/2018 |
| CN | 111147477 | A | 5/2020 |
| CN | 111444257 | A | 7/2020 |
| CN | 112152784 | A | 12/2020 |
| EP | 3313020 | A1 | 4/2018 |
| JP | 2006060722 | A | 3/2006 |
| JP | 2018117287 | A | 7/2018 |
| JP | 2018186495 | A | 11/2018 |
| JP | 2020502674 | A | 1/2020 |
| WO | 0143344 | A1 | 6/2001 |
| WO | 2006132143 | A1 | 12/2006 |
| WO | 2020024465 | A1 | 2/2020 |

OTHER PUBLICATIONS

Japanese Office Action; Application No. 2024531379; date of mailing: Sep. 24, 2025; 15 pages.

International Search Report for corresponding application PCT/CN2022/135697 filed Nov. 30, 2022; Mail date Feb. 22, 2023.

Chinese Office Action; Application No. 202111459938.6; Filing Date: Dec. 2, 2021; date of mailing: Jun. 10 2026; 15 pages.

* cited by examiner

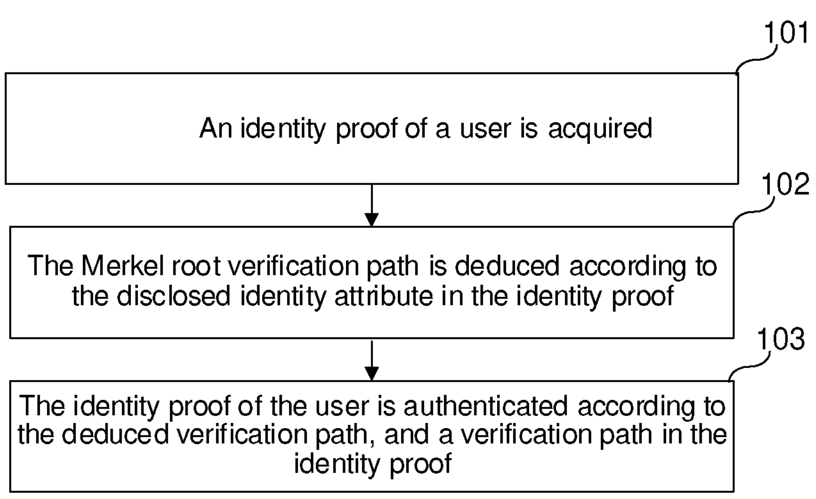

Fig. 1

Employment Credential

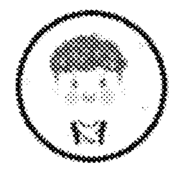

Name: Zhang San

Employee Number:

Department:

Position:

Phone number: 13988888888

Email: zhangsan@com.cn

Merkel root: sdhue3344kjkj4k2j

Merkel root verification path: 2681672hjhwuayusd761762761274 61hjqkwure892734uhr Issuing institution: Company A Agency ID: did:zte:67711khshjju Merkel root signature: se56hdfjks564jkdjkd Issuing time: 20210716 21:15:00

Signature: de7892b628168368321h3v

Signature algorithm: Elliptic curve Secp6k1

Generation time: 20210717 16:25:00 verification code:

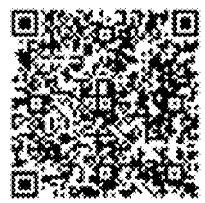

Fig. 2

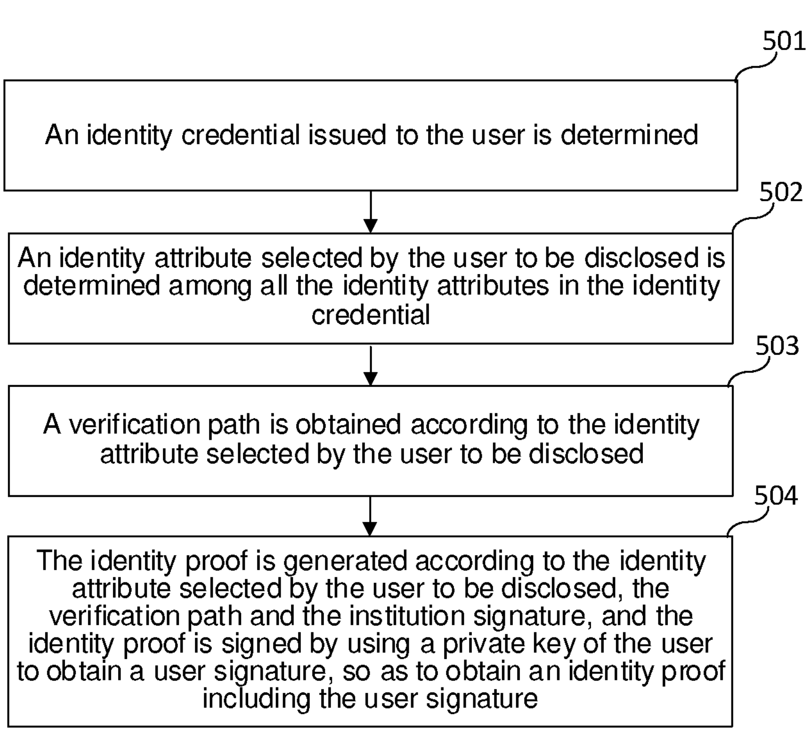

Fig. 5

—— Employment Credential ——

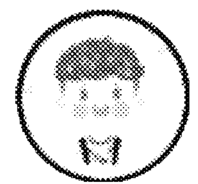

Name: Zhang San

Employee Number: 10222222

Department: Human Resources

Position: Human Resources Manager

Phone number: 13988888888

Email: Zhangsan@com.cn

Merkel root: Sdfsadsdfsjhfjshj shjhs

Issuing institution : Company A

Agency ID : Did:abc:6771jju

Merkel root signature: Se56hddfjks564jkdjkd

Issuing time : 20210716 21: 15: 00

Signature: De7892b628168321h3y

Signature algorithm: Elliptic curve Secp256k1

Verification code:

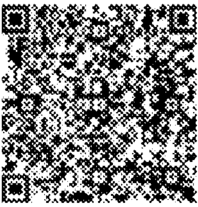

Fig. 6

IDENTITY AUTHENTICATION METHOD, ELECTRONIC DEVICE AND COMPUTER-READABLE STORAGE MEDIUM

CROSS-REFERENCE TO RELATED DISCLOSURE

The present disclosure is a national stage filing under 35 U.S.C. § 371 of international application number PCT/CN2022/135697, filed Nov. 30, 2022, which claims the priority of Chinese Patent Disclosure No. CN202111459938.6, filed on Dec. 2, 2021 and entitled "A method for Identity Authentication, Electronic Device, and Computer Readable Storage Medium", the disclosure of which is incorporated herein by reference in its entirety.

TECHNICAL FIELD

The present disclosure relate to the technical field of information security authentication, and in particular, to a method for identity authentication, an electronic device, and a computer readable storage medium.

BACKGROUND

With more and more activities of people on the Internet, the premise of using Internet services is to solve the identification problem of identities. The current means for identity authentication is relatively simple, and has a relatively large risk of leaking personal privacy information, which may cause the user information to be sold, resulting in severe losses of property and related interests. How to solve the privacy protection problem of personal information data is a major challenge faced by current digital identity authentication technologies.

SUMMARY

The present disclosure provides a method for identity authentication, an electronic device, and a computer-readable storage medium.

An embodiment of the present disclosure provides a method for identity authentication, which may include: acquiring an identity proof of a user, wherein the identity proof include an identity attribute of the user and a Merkel root verification path, and the Merkel root verification path in the identity proof is a verification path obtained when the identity proof is generated and based on the identity attribute selected by the user to be disclosed; deducing the Merkel root verification path according to the identity attribute disclosed in the identity proof; and authenticating the identity proof of the user according to the deduced verification path and the verification path in the identity proof.

An embodiment of the present disclosure also provides an electronic device, which may include: at least one processor; and a memory in communication connection with the at least one processor, wherein the memory stores instructions which can be executed by the at least one processor, and the instructions are executed by the at least one processor, so that the at least one processor can execute the method for identity authentication.

An embodiment of the present disclosure also provides a computer-readable storage medium, storing a computer program, wherein the computer program implements the described the method for identity authentication when being executed by a processor.

BRIEF DESCRIPTION OF THE DRAWINGS

FIG. 1 is a flowchart of a method for identity authentication according to an embodiment of the present disclosure;

FIG. 2 is a schematic diagram of a graphical identity proof according to an embodiment of the present disclosure;

FIG. 5 is a schematic flowchart of a method for generating an identity proof according to an embodiment of the present disclosure;

FIG. 6 is a schematic diagram of a graphical employment credential according to an embodiment of the present disclosure;

DETAILED DESCRIPTION OF THE EMBODIMENTS

Figure 3:
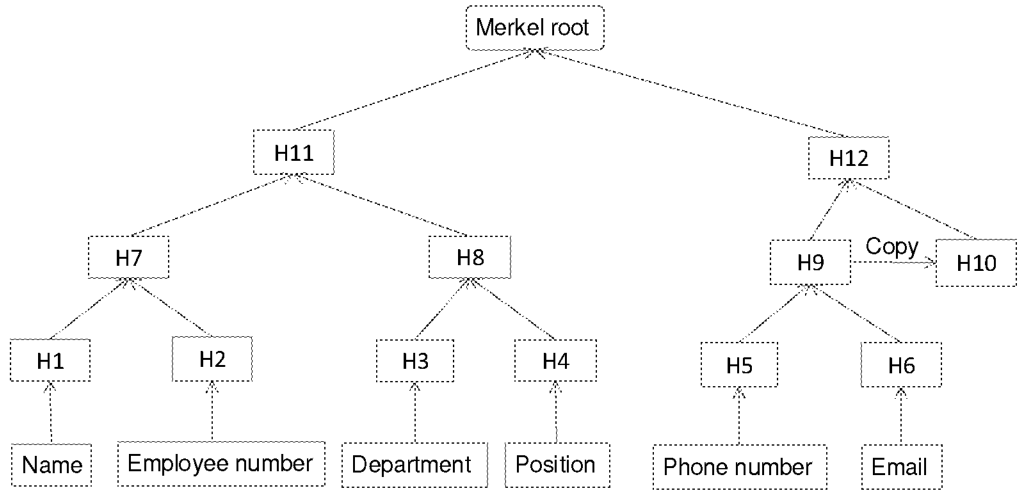
FIG. 3 is a schematic diagram of a constructed Merkel tree according to an embodiment of the present disclosure.

To make the objects, technical solutions, and advantages of the embodiments of the present disclosure clearer, hereinafter, embodiments of the present disclosure will be described in detail in combination with the accompanying drawings. However, a person of ordinary skill in the art may understand that in the embodiments of the present disclosure, many technical details are proposed to enable a reader to better understand some embodiments of the present disclosure. However, even without these technical details, based on various changes and modifications of the following embodiments, the technical solutions of the embodiments of the present disclosure can also be achieved. Dividing of the following embodiments is for convenience of description, and shall not constitute any limitation to specific implementations of the embodiments of the present disclosure. The embodiments may be referred to each other and combined with each other without any contradiction.

In order to facilitate understanding of the embodiments of the present disclosure, the related art involved in the embodiments of the present disclosure will be described below firstly:

A digital identity refers to concentrating real identity information into a public/private key in the form of a digital code, so as to bind, query, and verify real-time behavior information of an individual. The digital identity not only includes identity code information such as birth information, individual description and biological feature, but also relates to personal behavior information of various attributes. The core of the digital identity is a digital credential, and as the digital identity evolves through centralization, consortium and self-sovereign identity, the latest direction in the evolution of the digital credential is a verifiable credential.

A Merkel tree is an important technique for transaction storage in a block chaining block, and has the function of rapidly summarizing and verifying the existence and integrity of block data. That is, a single tree node can be checked without knowing the whole tree. The quick verification technique of the Merkel tree is widely applied to the validity verification of block transactions for block chains.

An embodiment of the present disclosure provides a method for identity authentication, which is applied to an identity authenticator. The identity authenticator may be an electronic device used by the authenticator, such as a terminal, and the identity authenticator may also be understood as an identity reviewer, which is referred to as a reviewer. The method for identity authentication in the present embodiment may be applied to a public cloud Internet environment, and may also be applied to a private cloud environment of an enterprise user. The system uses a combination mode of a service end and a terminal, wherein a digital identity service is mainly deployed in the service end; and an disclosure (app) is mainly deployed in the terminal, wherein the app may include two role views, i.e. an disclosure side user and a reviewing side user, and the two role views may be understood as operation interfaces of two different roles. On an operation interface of the disclosure side user, operations such as registration, disclosure of a credential, and generation of a proof are mainly involved; and an operation interface of the reviewing side user involves operations for verifying an identity proof presented by the user. The server end and the terminal end may perform network communication by using a Hyper Text Transfer Protocol (HTTP). For a flowchart of the method for identity authentication in the present embodiment, reference may be made to FIG. 1, which includes:

- Step 101: an identity proof of a user is acquired, wherein the identity proof includes an identity attribute of the user and a Merkel root verification path, and the Merkel root verification path in the identity proof is a verification path obtained when the identity proof is generated and based on the identity attribute selected by the user to be disclosed;
- Step 102: the Merkel root verification path is deduced according to the disclosed identity attribute in the identity proof; and
- Step 103: the identity proof of the user is authenticated according to the deduced verification path, and a verification path in the identity proof.

In one embodiment, when identity authentication is performed, identity authentication may be completed on the basis of an identity attribute selected by a user to be disclosed, and an identity attribute that the user does not want to disclose may be used as an undisclosed identity attribute, thereby avoiding leakage of an identity attribute that the user does not want to disclose. That is, in the embodiments of the present disclosure, identity authentication can be completed only by disclosing a small number of identity attributes, thereby avoiding the problem of leakage of privacy information of a user. The present invention solves the security problem that a conventional digital method for identity authentication (for example, all identity attributes need to be disclosed) has a poor protection for personal privacy data and leakage of privacy information.

In step 101, the identity authenticator may acquire an identity proof presented by a user, wherein the form of the identity proof may be a graphic form or a text form. The identity proof may be an employment credential, an educational credential of education, and the like. For the identification in a graphical form, reference may be made to FIG. 2. The identity authenticator may acquire the identity proof by scanning the identity proof presented by the user. Acquiring the identity proof of the user may be understood as acquiring information in the identity proof. The information in the identity proof may include: an identity attribute of the user and a Merkel root verification path, and the Merkel root verification path in the identity proof is a verification path obtained when the identity proof is generated and based on the identity attribute selected by the user to be disclosed; that is, when the identity proof is generated, the user may select an identity attribute that the user wants to disclose as an identity attribute to be disclosed, so that a digital identity service may obtain a Merkel verification path according to the identity attribute selected by the user to be disclosed, i.e. the Merkel verification path shown in FIG. 2.

The disclosed identity attribute may be understood as the specific content of the identity attribute that can be determined by means of the identity proof, for example, the name, the phone number and the email in FIG. 2 are all disclosed identity attributes. The undisclosed identity attribute may be understood as the specific content of an identity attribute that cannot be determined by means of the identity proof. For example, the undisclosed specific content of the identity attribute is marked with mosaic. Referring to FIG. 2, the employee number, the department, and the position in FIG. 2 are all undisclosed identity attributes.

In some embodiments, the identity proof also includes: an issuing institution of the identity proof, an ID of the issuing institution, an institution signature made by the issuing institution on the Merkel root by using a private key of the issuing institution, an issuing time, a signature made by a user on the identity proof using a private key, a signature algorithm used by the user for signature, and a two-dimensional verification code of the employment credential, wherein the two-dimensional verification code of the employment credential may be a Uniform Resource Locator (URL) generated according to identity authentication and verification information, the URL points to an online service address of a digital identity service, and a verification result about whether the identity authentication is valid, i.e. an authentication result about whether authentication is passed, can be obtained by accessing the URL. Referring to FIG. 2, the Merkel signature on the right of FIG. 2 is an institution signature made by the issuing institution on the Merkel root by using a private key of the issuing institution, and the signature in FIG. 2 is a signature made by a user on the identity proof using a private key.

In step 102, the identity authenticator may deduce the Merkel root verification path according to the disclosed identity attribute in the identity proof.

In one embodiment, deducing the Merkel root verification path includes: calculating, according to the disclosed identity attribute in the identity proof, a Hash value of the disclosed identity attribute in the identity proof; and deducing the Merkel root verification path according to the Hash value of the disclosed identity attribute and a constructed Merkel tree. For the schematic diagram of the constructed Merkel tree, reference may be made to FIG. 3. The Merkel tree may be constructed and obtained according to the identity attribute of the user (for example, the name, the employee number, the department, the position, the phone number, and the email in FIG. 3). In this embodiment, a plurality of identity attributes may be verified at one time by using the quick verification technique of the Merkel tree, which is efficient.

In one embodiment, deducing the Merkel root verification path according to the Hash value of the disclosed identity attribute and a constructed Merkel tree includes: determining, in an L1 layer of the Merkel tree, a node corresponding to the Hash value of the disclosed identity attribute, and adding the node to a deduction queue T1 corresponding to the L1 layer; and deducing from the bottom up of the Merkel tree, sequentially traversing the paired nodes (Hx, Hy) of each layer, and after the paired nodes (Hx, Hy) of each layer have been traversed, performing deduction to obtain the Merkel root verification path, wherein the following operations are executed on the traversed (Hx, Hy) in the Li layer:

if one node in the (Hx, Hy) is included in the deduction queue Ti corresponding to the Li layer, adding the Hash value of another node in the (Hx, Hy) to the verification path, calculating the Hash value of the (Hx, Hy), and adding the Hash value of the (Hx, Hy) to the deduction queue Ti+1 corresponding to the Li+1 layer, wherein 1≤i<deep, and deep is the depth of the Merkel tree;

if both the two nodes in the (Hx, Hy) are included in the deduction queue Ti corresponding to the Li layer, calculating a Hash value of the (Hx, Hy), and adding the Hash value of the (Hx, Hy) to the deduction queue Ti+1 corresponding to the Li+1 layer; and if no node in the (Hx, Hy) layer is included in the deduction queue Tj corresponding to the Li layer, starting to traverse the next (Hx, Hy) layer.

Figure 4:
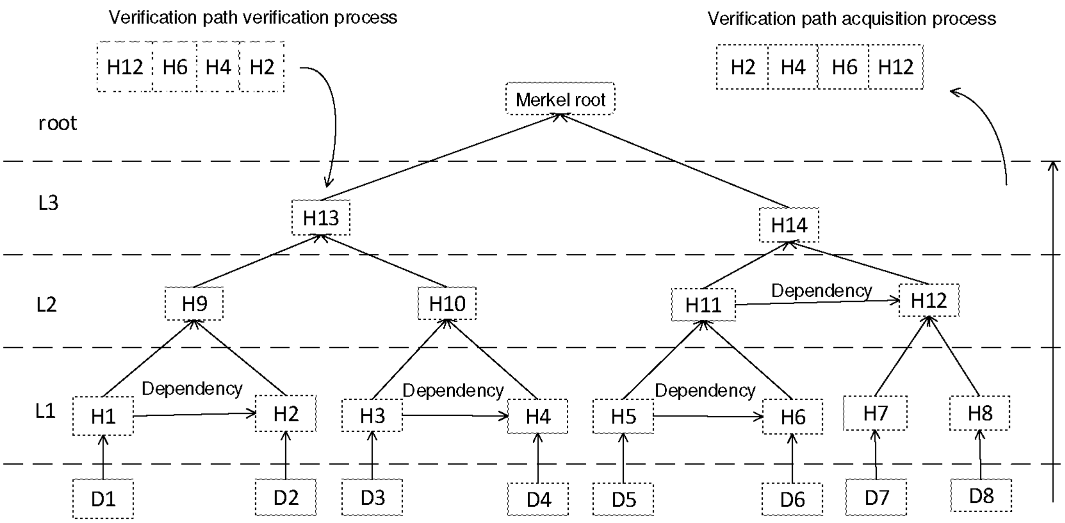
FIG. 4 is a schematic diagram of deducing a verification path on the basis of a disclosed identity attribute according to an embodiment of the present disclosure.

To facilitate understanding of the aforementioned deducing process, an example is provided below for illustration:

It is assumed that the number of identity attribute nodes is N, the depth of a Merkel tree is deep=log(N)+1, the hierarchy of the Merkel tree is represented as Li (1<i<deep), wherein i=1 starts from the L1 layer, and the hash value of the node in the L1 layer that represents the attribute value of the identity model is defined as Hj, j being a node number (sequentially numbered starting from 1). Referring to FIG. 4, the Merkel tree includes L1, L2 and L3 layers, the disclosed identity attributes include D1, D3 and D5, and the undisclosed identity attributes include D2, D4, D6, D7 and D8. In the L1 layer of the Merkel tree, nodes, which include H1, H3, and H5, corresponding to the Hash values of the disclosed identity attributes are determined, and the nodes H1, H3, and H5 are added to the deduction queue T1 corresponding to the L1 layer.

Deduction is performed from the bottom up of the Merkel tree, and the paired nodes (Hx, Hy) in the L1 layer are traversed first, wherein the paired nodes in the L1 layer include: (H1, H2), (H3, H4), (H5, H6), (H7, H8);

for a paired node (H1, H2), if a node H1 is located in T1, then H2 is added to the verification path, a Hash value of (H1, H2), i.e. H9, is calculated, and H9 is added to a deduction queue T2 corresponding to an L2 layer;

for a paired node (H3, H4), if a node H3 is located in T1, then H4 is added to the verification path, a Hash value of (H3, H4), i.e. H10, is calculated, and H10 is added to a deduction queue T2 corresponding to an L2 layer;

for a paired node (H5, H6), if a node H5 is located in T1, then H6 is added to the verification path, a Hash value of (H5, H6), i.e. H11, is calculated, and H11 is added to a deduction queue T2 corresponding to an L2 layer;

for a paired node (H7, H8), if no node is located in T1, skip and starts to traverse the next (Hx, Hy), as (H7, H8) is the last paired node in the L1 layer, skipping here refers to traversal of the paired nodes in the L2 layer. In specific implementation, if (H7, H8) is not the last paired node in the L1 layer, skipping refers to start traversing the paired nodes after (H7, H8).

After all the paired nodes in the L1 layer are traversed, it is determined that the deduction queue T2 corresponding to the L2 layer includes H9, H10, and H11, and the verification path includes H2, H4, and H6. The paired nodes in the L2 layer are started to be traversed, and the paired nodes in the L2 layer include: (H9, H10) and (H11, H12);

for a paired node (H9, H10), if two nodes H9 and H10 are both located in T2, then a Hash value of (H9, H10), i.e. H13, is calculated, and H13 is added into a deduction queue T3 corresponding to the L3 layer;

for a paired node (H11, H12), if a node H11 is located in T2, then H12 is added to the verification path, a Hash value of (H11, H12), i.e. H14, is calculated, and H14 is added to a deduction queue T3 corresponding to an L3 layer.

After all the paired nodes in the L2 layer are traversed, it is determined that the deduction queue T3 corresponding to the L3 layer includes H13 and H14, and the verification path includes H2, H4, H6 and H12. The paired nodes in the L3 layer are started to be traversed, and the paired nodes in the L3 layer include: (H13, H14);

for a paired node (H13, H14), if two nodes H13 and H14 are both located in T2, then a Hash value of (H13, H14), i.e., a Merkel Root is calculated. So far, the layers of the Merkel tree are traversed, and the finally obtained verification path include: H2, H4, H6, and H12.

In one embodiment, the verification path in the identity proof may also be determined by referring to the foregoing deducing process. The described deducing method provided in the embodiment facilitates performing deduction to obtain an accurate verification path, and can verify a plurality of undisclosed identity attributes at one time, so as to improve the accuracy of identity authentication and the authentication efficiency.

In step 103, in cases it is determined that the deduced authentication path is identical to the authentication path in the identity proof, the identity authenticator may determine that the identity authentication of the user is passed.

In one embodiment, the identity proof also includes a verification code of the identity proof. Before acquiring the identity proof of the user, the method further includes: generating a graphical identity proof on the basis of the identity attribute selected by the user to be disclosed, wherein a verification code of the identity proof is displayed in the graphical identity proof; and acquiring an identity authentication result of the user by scanning the verification code in the graphical identity proof. The verification code may be a URL generated according to the identity proof, the URL points to an online service address of a digital identity service, and a verification result about whether the identity authentication is valid can be obtained by accessing the URL. After the graphical identity proof is generated, the identity authenticator can send the generated graphical identity proof to a terminal used by the user, and when it is required to authenticate the identity proof of the user, the identity authenticator may scan the graphical identity proof presented by the user, to obtain an identity authentication result. The verification code of the identity proof may be the two-dimensional verification code in FIG. 2, and the identity authenticator may obtain an identity authentication result for the user by scanning the two-dimensional verification code. By means of verification by code scanning, an authentication result of the identity proof can be acquired conveniently.

In one embodiment, the identity proof further includes: a digital identity ID of the user, and a signature made by a user on the identity proof using a private key; and after acquiring the identity proof of the user, the method further includes: acquiring a public key of the user from a block chain according to the digital identity ID of the user, and verifying the user signature by means of the public key of the user. Authenticating the identity proof of the user according to the deduced verification path, and a verification path in the identity proof in Step 103 includes: in cases where the deduced verification path is consistent with a verification path in the identity proof and the verification of the user signature is passed, determining that the identity authentication of the user is passed.

In one embodiment, acquiring a public key of the user from a block chain according to the digital identity ID of the user includes: acquiring a user profile according to the digital identity ID of the user, wherein the user profile is obtained according to identity registration information of the user when performing identity registration on the user, and the user profile is stored in a block chain; acquiring the public key of the user from the block chain according to the user profile. The user may perform identity registration in a digital identity service deployed by the server. A user profile does not include privacy information of a user, and identity registration information may include: a personal account of the user, an identity model, a digital identity ID of the user, a version of the identity model, and a public key of the user. The identity model may be a model created by an issuing institution and used for generating an identity proof, and after creating the identity model, the issuing institution may issue the identity model in a block chain. In the present embodiment, by associating a block chain with an issuing institution, a user and an identity authenticator, it is convenient for the identity authenticator to acquire the public key of the user from the block chain.

In one embodiment, the identity proof also includes: a digital identity ID of an issuing institution of the identity proof, and an institution signature made by the issuing institution on the Merkel root by using a private key of the issuing institution; and after acquiring the identity proof of the user, the method further includes: acquiring the public key of the issuing institution from the block chain according to the digital identity ID of the issuing institution, and verifying the institution signature by means of the public key of the issuing institution; authenticating the identity proof of the user according to the deduced verification path, and a verification path in the identity proof in Step 103 includes: in cases where the deduced verification path is consistent with a verification path in the identity proof and the verification of the institution signature is passed, determining that the identity authentication of the user is passed.

In one embodiment, acquiring the public key of the issuing institution from the block chain according to the digital identity (ID) of the issuing institution, includes: acquiring an issuing institution profile according to the digital identity (ID) of the issuing institution, wherein the issuing institution profile is obtained according to identity registration information of the issuing institution when performing identity registration on the issuing institution, and the issuing institution profile is stored in a block chain; and acquiring the public key of the issuing institution from the block chain according to the issuing institution profile. The issuing institution profile does not include private information of the issuing institution, and the registration information of the issuing institution may include: the institution name of the issuing institution, the digital identity ID of the issuing institution, the public key of the issuing institution, etc. Before the issuing institution issues the identity model in the block chain, the issuing institution may first perform identity registration in the digital identity service deployed by the service end. In the present embodiment, by associating a block chain with an issuing institution, a user and an identity authenticator, it is convenient for the identity authenticator to acquire the public key of the issuing institution from the block chain.

In one embodiment, the identity proof further includes: a digital identity ID of a user, a digital identity ID of an issuing institution of the identity proof, an institution signature made by the issuing institution on the Merkel root by using a private key of the issuing institution, and a signature made by a user on the identity proof using a private key; and after acquiring the identity proof of the user, the method further includes: acquiring a public key of the user from a block chain according to the digital identity ID of the user, and verifying the user signature by means of the public key of the user; acquiring the public key of the issuing institution from the block chain according to the digital identity (ID) of the issuing institution; and verifying the institution signature by means of the public key of the issuing institution. Authenticating the identity proof of the user according to the deduced verification path, and a verification path in the identity proof in Step 103 includes: in cases where the deduced verification path is consistent with a verification path in the identity proof, the verification of the user signature is passed, and the verification of the institution signature is passed, determining that the identity authentication of the user is passed.

In tone embodiment, while the deduced verification path is verified, a user signature and/or an institution signature may also be verified, which is equivalent to further improving the threshold of the identity authentication being passed, and is beneficial to further improving the security of identity authentication.

In one embodiment, the method for generating an identity proof may refer to FIG. 5, including:

- step 501: an identity credential issued to the user is determined, wherein the identity credential includes: all the identity attributes of the user, a Merkel root of all the identity attributes, and an institution signature made by the issuing institution of the identity credential on the Merkel root by using the private key of the issuing institution;
- step 502: an identity attribute selected by the user to be disclosed is determined among all the identity attributes in the identity credential;
- step 503: a verification path is obtained according to the identity attribute selected by the user to be disclosed; and
- step 504: the identity proof is generated according to the identity attribute selected by the user to be disclosed, the verification path and the institution signature, and the identity proof is signed by using a private key of the user to obtain a user signature, so as to obtain an identity proof including the user signature.

In one embodiment, in combination with an identity credential issued by a user and an identity attribute selected by the user to be disclosed, it is beneficial to generate an identity proof that only partial identity attributes of the user are disclosed, thereby protecting identity attributes that the user does not want to be leaked.

At Step 501, the identity credential may be issued by a digital identity service deployed by the service end, and the identity credential may be an employment credential, an educational credential, a degree credential, an identity card, etc., and the issuing institution of the identity credential is usually an authority, for example, the issuing institutes for the educational credential, the degree credential and the identity card are all specific institutes specified by the country. The form of the identity credential may be a graphic form or a text form. For a schematic diagram of the employment credential in the graphic form, reference may be made to FIG. 6. The employment credential may include: all the identity attributes (such as the name, the employee number, the department, the position, the phone number, and the email in FIG. 6) of the user, a Merkel root of all the identity attributes (such as the Merkel root on the last row on the left side in FIG. 6), and an institution signature (an institution signature is such as the Merkel signature in FIG. 6) made by the issuing institution of the identity credential on the Merkel root by using the private key of the issuing institution (such as company A in FIG. 6). Optionally, in some embodiments, the identity credential can further include: an institution ID of an issuing institution, an issuing time of the identity credential, a signature made on the identity credential by using a private key of the user, a signature algorithm used by the signature, and a verification code of the employment credential. The verification code of the employment credential may be a URL generated according to credential verification information, the URL points to an online service address of a digital identity service, and a verification result about whether the employment credential is valid can be obtained by accessing the URL. The display order of the identity attributes on the employment credential may be a location order of the leaf nodes on the Merkel tree.

At Step 502, the user may select, from all the identity attributes displayed on the display interface of the disclosure (app), an identity attribute to be disclosed, so that the identity authenticator acquires the identity attribute selected by the user to be disclosed.

At Step 503, the identity authenticator may obtain a verification path according to the identity attribute selected by the user to be disclosed. For the specific method for obtaining the verification path, reference may be made to the schematic diagram of the deducing process of the verification path in FIG. 4, which is not described herein again to avoid repetition.

At Step 504, the identity authenticator may generate an identity proof including the disclosed identity attribute, the verification path and the institution signature according to an identity attribute selected by the user to be disclosed, the verification path, and the institution signature, and sign the identity proof by using a private key of the user to obtain a user signature, so as to obtain an identity proof further including the user signature.

Figure 7:
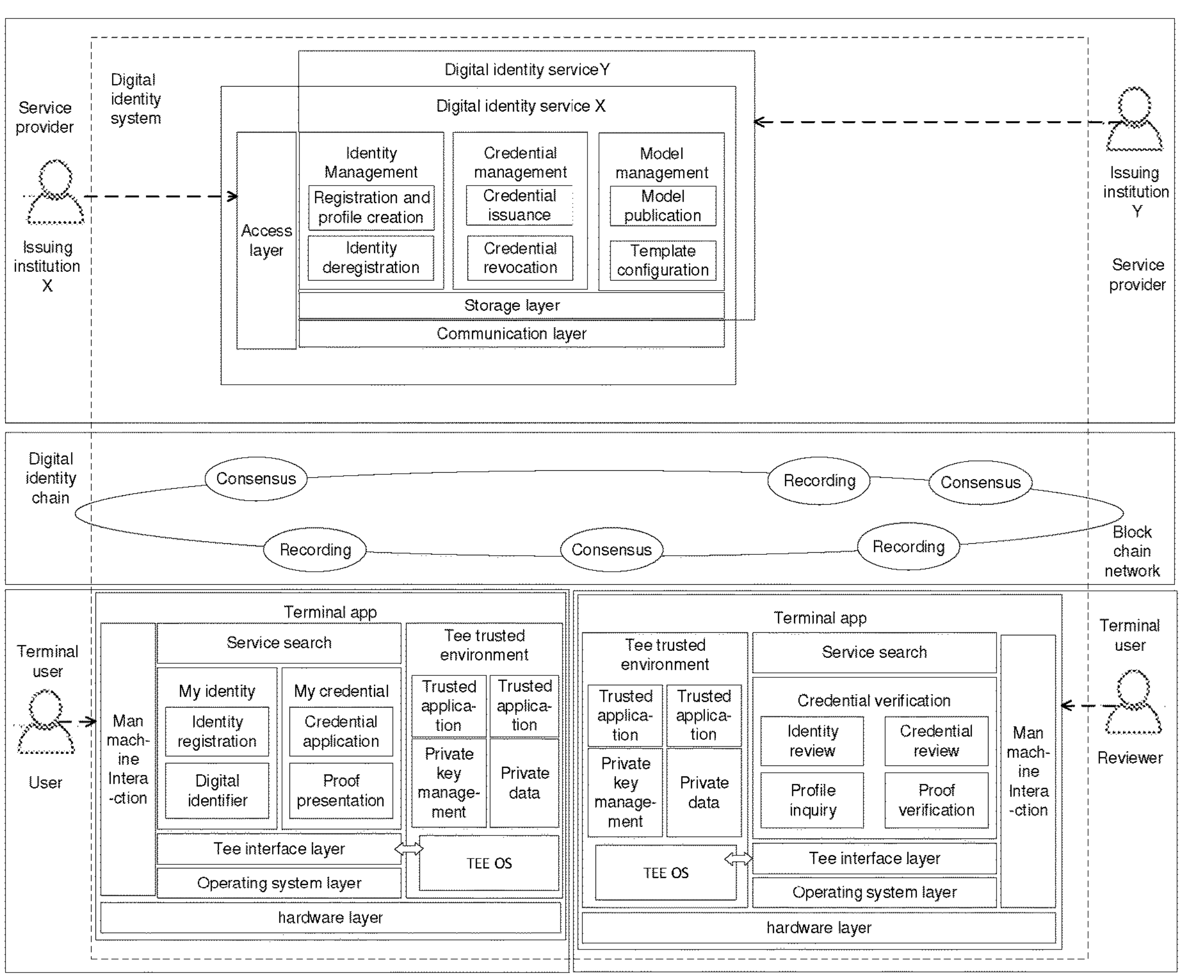
FIG. 7 is a schematic diagram of a decentralized service-oriented software architecture according to an embodiment of the present disclosure.

In one embodiment, a method for identity authentication relates to three parties, and may use a decentralized service-oriented software architecture. The three parties include: a service provider of a digital identity service, a user and a reviewer (the reviewer may also be referred to as identity authenticator). The three parties are in a many-to-many relationship, and are associated by a block chain network. Refer to FIG. 7, the software architecture includes a digital identity service, a digital identity disclosure, a block chain network, and an intelligent contract. The digital identity service may include a digital identity service corresponding to an issuing institution X and a digital identity service corresponding to an issuing institution Y. The issuing institution X may provide the digital identity service X, and the issuing institution Y may provide the digital identity service Y. The digital identity disclosure is a terminal app. The terminal app may include a user-oriented operation interface and a reviewer-oriented operation interface. The software architecture is described below in detail:

The block chain network may be a common block chain such as Hyperledger Fabric and Fisco Bcos, is an alliance chain network constructed by a digital identity service group, and is used for storing processes such as model service publication, digital identity and issuing certificate on block chain, so as to facilitate search and tracing.

The digital identity service issued by a service provider is a software-as-a-Service (SaaS) provided for a terminal user. Different service providers can issue different digital identity services, and the digital identity services issue identity models to a block chain network for access by a terminal user. The terminal user finds the service address on the block chain network according to the identity model, and performs related identity registration and credential disclosure activities. The digital identity service includes: an access layer, identity management, credential management, model management, a storage layer and a communication layer. The content included in the digital identity service is specifically described below:

The access layer is used for providing access operations for digital identity services, and includes a UI interface or a command line interface;

identity management: having the function of managing a user identity registered by a digital identity service, comprising identity registration, establishment of a user profile, and deregistration of a registered identity;

credential management: generating a verifiable identity credential according to an identity model, and having the function of managing issuing of the credential, comprising credential issuance and credential revocation;

Model Management: Model the identity model and publish it on the block chain, including: publishing the identity model and configuring the credential templates related to identity;

storage layer: storing meta data of the identity model, and performing encrypted storage of the identity attribute of the registered user;

communication layer: providing an HTTP service interface for access of terminal users, and being an operational and transactional interface with the block chain network;

digital identity disclosure: i.e. an disclosure (app) in the figure, wherein the disclosure (app) is deployed on a mobile phone or a tablet terminal of a terminal user, and includes two role views, i.e. an disclosure side user (i.e. the user at the lower left corner in the figure) and a reviewing side user (i.e. a reviewer at the lower right corner in the figure), the disclosure (app) mainly involves operations of registration, disclosure of a credential, and generation of a proof, and the reviewing mainly involves operation of verification of the presented credential. The digital identity disclosure mainly relates to human-computer interaction, service retrieval, my identity, my credential, credential verification, TEE trusted environment, TEE interface layer, operating system layer and hardware layer. The main content of the digital identity disclosure is specifically described below:

human-computer interaction: a human-computer interaction UI realized by inputting and outputting hardware such as touching a screen and touching a button;

service retrieval: retrieving an identity model from a block chain network, and acquiring a service access address of a digital identity service;

my identity: being oriented to disclosure side users, performing identity registration on a digital identity service provider, and acquiring an identity identifier and an identity profile;

my credential: being oriented to disclosure side users, performing a credential disclosure on a digital identity service provider, obtaining an identity credential, and generating an identity proof;

credential verification: being oriented to reviewing side users, and providing functions of identity authentication, profile query, credential reviewing and proof verification;

TEE trusted environment: a TEE trusted environment built in a terminal device, a management and trusted disclosure providing private data of users, comprising: performing following operations in a trusted environment: user private key management, performing signature and decryption operations by using a private key, performing calculation processing on private data, etc., thereby protecting privacy security of a user;

TEE interface layer: an interface for communication between a TEE environment and the outside;

operating system layer: an operating system built in the terminal, such as Android and ios;

hardware layer: a terminal hardware device includes a chip, a memory, a touch screen, etc.;

intelligent contract: being responsible for issuing a digital identity service, storing identity registration on the block chain, storing credential issuance on the block chain, user verification, and storing credit evaluations on the block chain for key information, facilitating easy retrieval and traceability. In the present embodiment, a decentralized service-oriented software architecture is used, there is a many-to-many relationship among an issuing institution, a user, and a reviewer, and the entities are associated by means of a block chain network. A user registers with an issuing institution; the issuing institution issues a digital identity ID to the user, and publishes the digital identity ID to a chain; a corresponding public key can be acquired on a chain according to the digital identity ID for signature verification; and a quick verification technique of a block chain Merkel tree is used in data identity authentication, so as to solve the security problem of leakage of data privacy in conventional identity verification. In this embodiment, a plurality of identity attributes may be verified at one time by using the fast verification technology of the Merkel tree, which is efficient.

In one embodiment, the identity attributes registered by the user are organized in the form of a Merkel tree, a Merkel root of the Merkel tree is calculated, and reference may be made to FIG. 3 for the organization. The identity attributes are organized in a manner of a Merkel tree, and then the Merkel tree may be referred to as an identity attribute tree.

In one embodiment, an issuing institution issues a digital identity credential. The identity credential may be in a graphical display manner. The figure includes all identity attributes, a Merkel root of an identity attribute tree, and a signature made by the issuing institution on the Merkel root and identity credential content. A verifiable effect of the identity credential can be achieved by verifying the signature and the Merkel root. For the graphical identity credential, reference can be made to FIG. 6. The display order of the credential attributes is the location order of the leaf nodes of the Merkel tree.

In one embodiment, a certified user selects to disclose partial identity attributes to generate an identity proof; the identity proof may use a graphical display manner; the graph includes partially disclosed identity attributes, a Merkel root of the identity attributes, an authentication path of a Merkel tree, a signature made by an issuing institution on the Merkel root, and a signature made by a user on the identity proof content; a verifiable effect of the identity proof may be achieved by verifying the signature and verifying the Merkel root according to the disclosed attributes and the authentication path. For the graphical identity proof, reference may be made to FIG. 2. The display order of the disclosed identity attributes is the location order of the leaf nodes on the Merkel tree, and the undisclosed identity attributes are displayed with a mosaic blur effect.

In one embodiment, the method for the graphical representations of an identity credential and an identity proof is disclosed, and a method for scanning and verifying a two-dimensional code is introduced, which can conveniently review and verify the credential and the proof.

Figure 8:
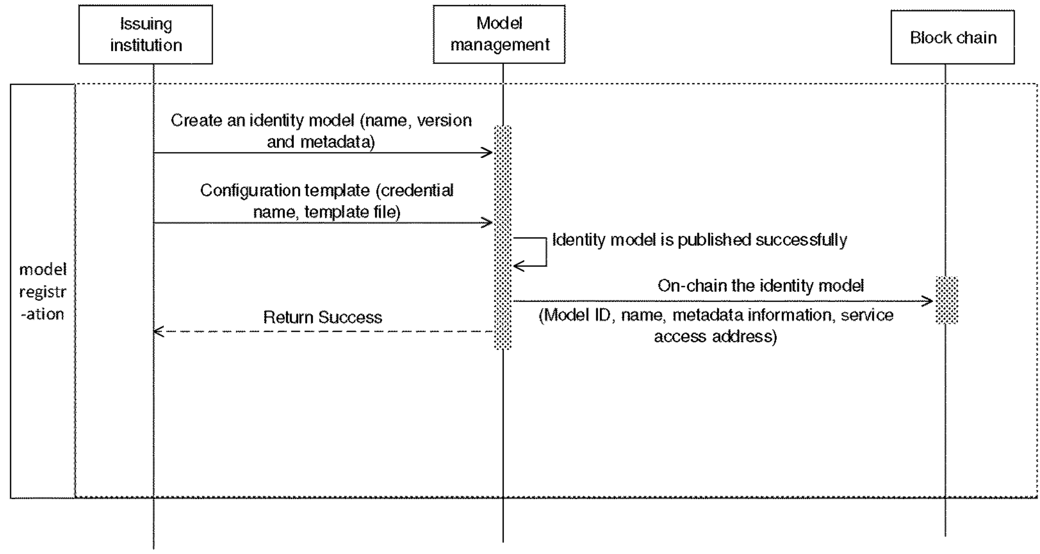
FIG. 8 is a schematic flowchart of a model registration procedure according to an embodiment of the present disclosure.

In one embodiment, the method for identity authentication involves a model registration procedure, an identity registration procedure, an identity credential disclosure procedure, an identity proof generation procedure, and an identity proof reviewing procedure. Model registration procedure, i.e. an issuing institution creates a model and publishes a digital identity service on a block chain. Identity registration procedure, i.e. a user searches for an identity model on a block chain, registers with an issuing institution, and applies for an identity credential. Identity credential disclosure procedure, i.e. the issuing institution issues verifiable identity credentials to the applicant, and performs on-chain storage of the process. Identity proof generation procedure, i.e. a user generates an identification by selecting a partial identity attribute that exposes the identity credential. Identity proof reviewing procedure, i.e. a reviewer checks the validity of a credential in cases where only few identity attributes of a user are obtained, and verifying the authenticity and validity of the identity proof. The above procedures are specifically described below:

Refer to FIG. 8, FIG. 8 is a schematic flowchart of a model registration process. The model registration refers to registration of an identity model, an issuing institution creates an identity model, and each type of identity model corresponds to a digital identity. A user may register different identity models of one issuing institution, and may also register different identity models of different issuing institutions. The model registration process includes:

first, an issuing institution uses a model management function of a digital identity system to create an identity model, and fills in model parameters of the identity model, wherein the model parameters include the name, the version and meta data information of the model;

then, after the identity model is created, the credential information associated with the identity model is configured by means of a template configuration function managed by the model, and the configuration content includes: a name and a template profile (used for the graphical display of the credential);

next, after the identity model is published successfully, the model management system on-chains the created identity model, and the uplink information includes a model ID, a name, meta data information and a service access address, so as to facilitate the retrieval and access by a user;

finally, the model management returns a creation success message to the issuing institution.

Figure 9:
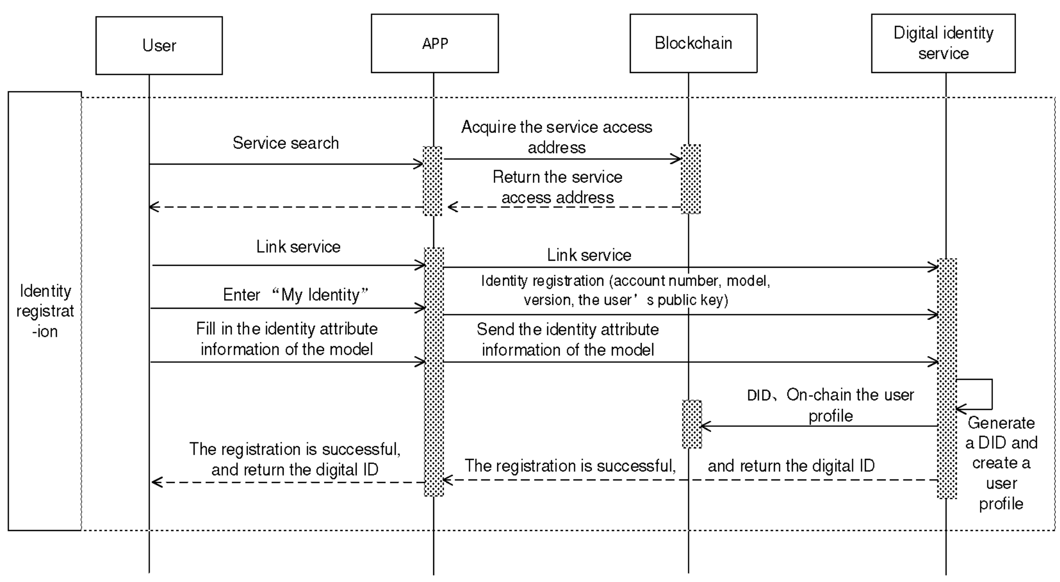
FIG. 9 is a schematic flowchart of an identity registration procedure according to an embodiment of the present disclosure.

Refer to FIG. 9, FIG. 9 is a schematic flowchart of a identity registration process. In the procedure, a user retrieves a relevant identity model from a block chain by means of an disclosure (app), acquires a service access address according to the identity model, and performs identity registration with a service providing institution corresponding to the service access address. The issuing institution generates a digital identity (ID) and creates a profile for a user, and on-chains the user digital identity. The identity registration process includes:

first, a user enters a "service search" functional interface of an app, and performs service search on a block chain to obtain a service access address;

then, the user enters a "my identity" functional interface of the app to perform identity registration, wherein the registration information includes the account, model and version of an individual and a public key of the user;

Next, the digital identity service issues a digital identity document (DID) to the user, establishes a user profile, and performs on-chain storage of the DID and the user profile, which facilitates research by the reviewer, wherein the user profile does not include privacy information of the user.

Finally, the digital identity service returns a registration success message and returns the digital identity (ID) of the user.

Figure 10:
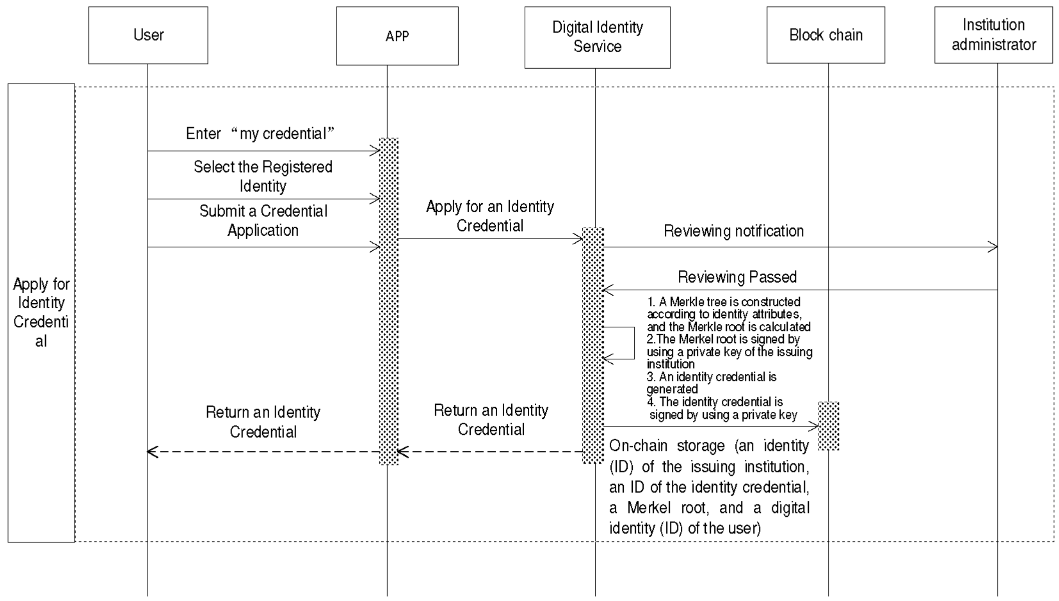
FIG. 10 is a schematic flowchart of an identity credential disclosure procedure according to an embodiment of the present disclosure.

Refer to FIG. 10, FIG. 10 is a schematic flowchart of the identity credential disclosure procedure. After completing identity registration, a user can apply for an identity credential to a digital identity service deployed by a service end, wherein the identity credential includes identity model information, a Merkel root of an identity attribute, and a signature made by an issuing institution on the Merkel root, and furthermore, the issuing institution performs on-chain storage of the process, so as to facilitate tracing. The identity credential disclosure procedure includes:

first, a user enters a "my credential" functional interface of an disclosure (app), and selects a corresponding identity model from registered identities to submit a credential disclosure to a digital identity service deployed by a service end;

next, after the institution administrator approves, the data identity service constructs a Merkel tree according to identity attributes, and calculates the Merkel root;

secondly; the issuing institution signs the Merkel root by using a private key of the issuing institution, and generates an identity credential, wherein the identity credential includes two display formats, i.e. graphics and text;

then, the issuing institution signs the identity credential by using a private key, and performs on-chain storage of the issuing process (the on-chain information comprising information such as an identity (ID) of the issuing institution, an ID of the identity credential, a Merkel root, and a digital identity (ID) of the user);

finally, the data identity service returns the identity credential to the disclosure (app), and the disclosure (app) returns the identity credential to the user.

Figure 11:
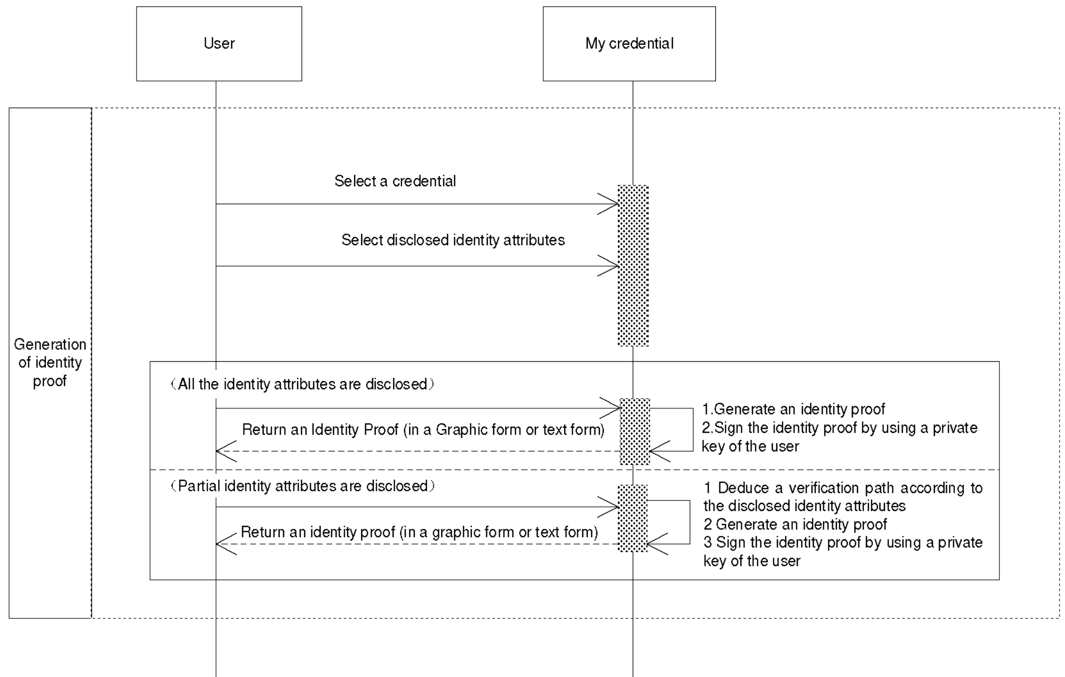
FIG. 11 is a schematic flowchart of an identity proof generation procedure according to an embodiment of the present disclosure.

Refer to FIG. 11, FIG. 11 is a schematic flowchart of an identity proof generation procedure. The user selects to disclose partial identity attributes of the identity credential, and generates an identity proof (for example, generating an employment proof with the employment credential, and generating a degree proof with the degree credential). The identity proof includes the disclosed identity attributes, a Merkel root, a signature made by the issuing institution on the Merkel root, a verification path for verifying that the disclosed identity attributes belong to the Merkel root, and a the signature made by the user on the identity proof. The credential generation procedure includes:

first, a user enters a "my credential" functional interface of an disclosure (app), selects an issued identity credential, and clicks to generate an identity proof;

then, one or more identity attributes to be disclosed are selected among the identity attributes in the identity credential, and clicking is performed for submission;

next, the disclosure (app) generates an identity proof, and signs the identity proof by using a private key of the user, so as to obtain an identity proof comprising the user signature;

finally, the disclosure (app) returns the identity proof.

Figure 12:
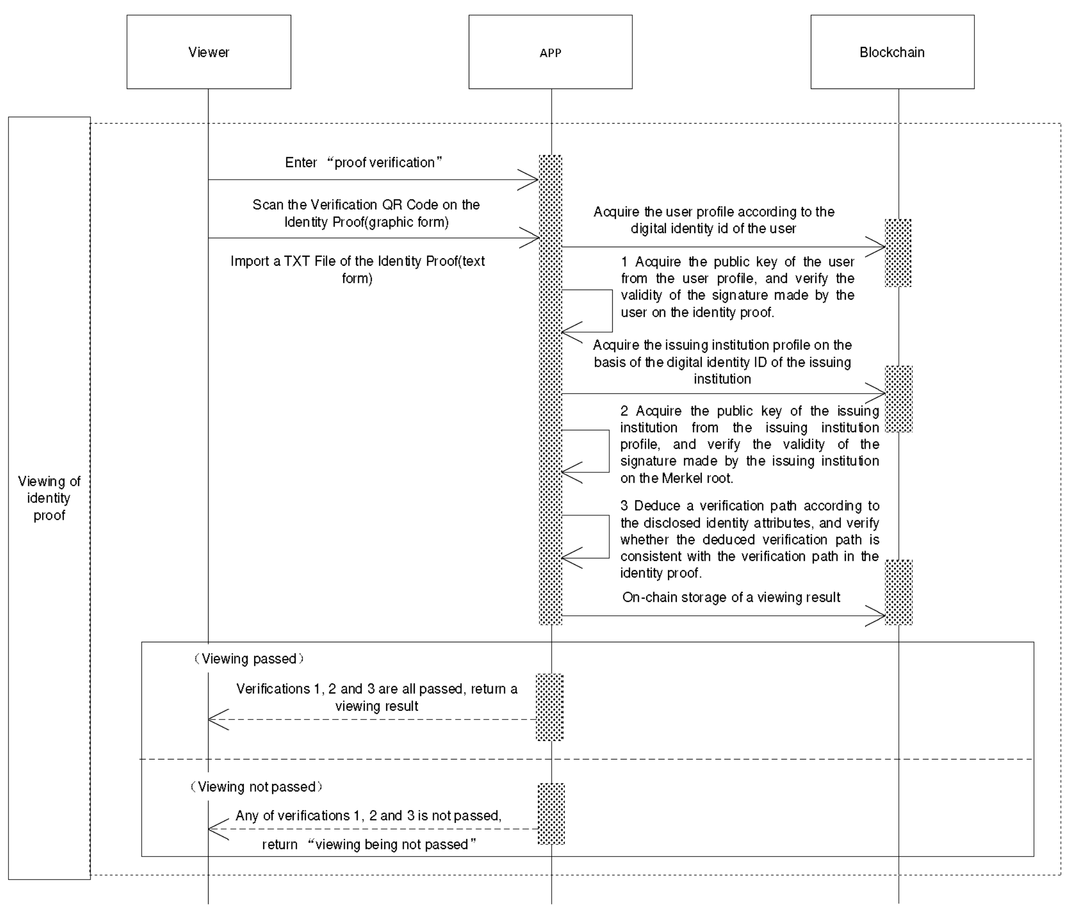
FIG. 12 is a schematic flowchart of an identity proof reviewing procedure according to an embodiment of the present disclosure.

Refer to FIG. 12, FIG. 12 is a schematic flowchart of an identity proof reviewing procedure. The reviewer verifies the authenticity and validity of the identity proof. The identity proof includes the disclosed partial identity attributes, a Merkel root of a Merkel tree where said partial identity attributes are located, and a verification path. The validity of the disclosed partial identity attributes can be verified by deducing the verification path. In this way, the risk of leaking other private information of a user can be avoided. The identity proof viewing may also be understood as identity proof authentication, and a viewing result of the identity proof is an authentication result of the identity proof. The identity proof viewing procedure includes:

first, the reviewer enters a "proof verification" functional interface of an disclosure (app), scans a verification two-dimensional code in an identity proof picture provided by a user, and views the identity proof;

then, the disclosure (app) acquires the user profile from the block chain according to the digital identity ID of the user, acquires the public key of the user from the user profile, and verifies the validity of the signature made by the user on the identity proof (verification 1);

secondly, the disclosure (app) acquires the issuing institution profile from the block chain according to the digital identity ID of the issuing institution, acquires the public key of the issuing institution from the issuing institution profile, and verifies the validity of the signature made by the issuing institution on the Merkel root (verification 2);

then, the disclosure (app) deduces a verification path according to the disclosed identity attributes, and verifies whether the deduced verification path is consistent with the verification path in the identity proof (verification 3);

finally, if all the foregoing verifications 1-3 are passed, it is determined that the reviewing result is that the verification for the identity credential is passed, and if any of the foregoing certifications 1-3 is not passed, it is determined that the reviewing result is that the verification for the identity credential is not passed. The reviewer finally performs on-chain storage of the result of this verification, and the act of forging proofs will be included in the credibility record of the user, so as to facilitate the subsequent tracing In one embodiment, a method for performing identity authentication by only disclosing partial identity attributes of a user, a graphical display manner of a identity proof, and a two-dimensional code verification method of an identity credential are implemented by using a Merkel quick verification technique of a block chain, which can not only solve the problem of protection of personal privacy data, but also conform to the usage habit of current users, is highly operable, and facilitates market promotion of a product.

It should be noted that, the foregoing examples in the embodiments of the present disclosure are all examples for easy understanding, and do not limit the technical solutions of the embodiments of the present disclosure.

The division of the steps of the above methods is only for the sake of clear description, and in practical disclosures, the steps may be combined into one step, or some steps may be further divided into multiple steps. Such combination or division falls within the scope of protection of the present disclosure as long as the same logical relationship is included. Any insignificant modification made to or any insignificant design introduced in an algorithm or process without changing the core design of the algorithm and process shall fall within the scope of protection of the present patent.

Figure 13:
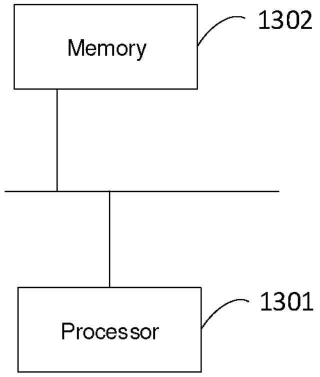
FIG. 13 is a schematic structural diagram of an electronic device according to an embodiment of the present disclosure.

One embodiment of the present disclosure provides an electronic device. As shown in FIG. 13, the electronic device includes: at least one processor 1301, and a memory 1302 in communication connection with the at least one processor 1301. The memory 1302 stores an instruction that can be executed by the at least one processor 1301, and the instruction is executed by the at least one processor 1301. The at least one processor 1301 can execute the foregoing the method for identity authentication.

The memory 1302 and the processor 1301 are connected through a bus, the bus may include any number of interconnected buses and bridges, and the bus interconnects various circuits of one or more processors 1301 and the memory 1302. The bus may further link various other circuits such as a peripheral device, a voltage regulator, and a power management circuit together. These are all well-known in the art, and therefore are not further described in the present specification. The bus interface provides an interface between the bus and a transceiver. The transceiver may be one element or a plurality of elements, for example, a plurality of receivers and a plurality of transmitters, to provide a unit configured to communicate with various other apparatuses on a transmission medium. Data processed by the processor 1301 is transmitted on a wireless medium by using an antenna. Further, the antenna further receives data and transmits the data to the processor 1301.

The processor 1301 is responsible for managing the bus and general processing, and may further provide various functions, including timing, peripheral interfacing, voltage regulation, power management, and another control function. The memory 1302 may be configured to store data used when the processor 1301 executes an operation.

An embodiment of the present disclosure further provides a computer-readable storage medium having stored there on a computer program that, when executed by a processor, implements the foregoing method embodiments.

That is, those skilled in the art can understand that all or some of the steps in the methods of the above embodiments may be completed by a program instructing relevant hardware, the program is stored in a storage medium, and includes several instructions used to cause a device (which may be a single-chip microcomputer, a chip, etc.) or a processor to perform all or some of the steps of the method in various embodiments of the present disclosure. The storage medium includes: various mediums that can store program code, such as a USB flash drive, a mobile hard disk, a read-only memory (ROM), a random access memory (RAM), a magnetic disk, or an optical disk.

Those skilled in the art can understand that the above embodiments are specific examples for realizing the present disclosure, and in actual disclosure, various changes may be made in form and details without departing from the spirit and range of the present disclosure.

What is claimed is:

1. A method for identity authentication, comprising:

acquiring an identity proof of a user, wherein the identity proof comprises an identity attribute of the user and a Merkle root verification path, and the Merkle root verification path in the identity proof is a verification path obtained when the identity proof is generated and based on an identity attribute selected by the user to be disclosed;

deducing the Merkle root verification path according to the disclosed identity attribute in the identity proof; and authenticating the identity proof of the user according to the deduced verification path and the verification path in the identity proof;

wherein the identity proof is generated in the following manner:

determining an identity credential issued to the user, wherein the identity proof comprises: all the identity attributes of the user, a Merkle root of all the identity attributes, and an institution signature made by the issuing institution of the identity credential on the Merkle root by using the private key of the issuing institution;

determining, among all the identity attributes in the identity credential, an identity attribute selected by the user to be disclosed;

obtaining the verification path according to the identity attribute selected by the user to be disclosed; and generating the identity proof according to the identity attribute selected by the user to be disclosed, the verification path and the institution signature, and signing the identity proof by using the private key of the user to obtain a user signature, so as to obtain an identity proof including the user signature.

2. The method for identity authentication according to claim 1, wherein deducing the Merkle root verification path according to the disclosed identity attribute in the identity proof comprises:

calculating, according to the disclosed identity attribute in the identity proof, a Hash value of the disclosed identity attribute in the identity proof; and deducing the Merkle root verification path according to the Hash value of the disclosed identity attribute and a constructed Merkle tree.

3. The method for identity authentication according to claim 2, wherein deducing the Merkle root verification path according to the Hash value of the disclosed identity attribute and a constructed Merkle tree comprises:

determining, in an L1 layer of the Merkle tree, a node corresponding to the Hash value of the disclosed identity attribute, and adding the node to a deduction queue T1 corresponding to the L1 layer;

deducing from the bottom up of the Merkle tree, sequentially traversing paired nodes (Hx, Hy) of each layer, and after the paired nodes (Hx, Hy) of each layer have been traversed, performing deduction to obtain the Merkle root verification path, wherein the following operations are executed on the traversed the paired nodes (Hx, Hy) in the Li layer:

in a case where one node in the (Hx, Hy) is comprised in the deduction queue Ti corresponding to the Li layer, adding the Hash value of another node in the (Hx, Hy) to the verification path, calculating the Hash value of the (Hx, Hy), and adding the Hash value of the (Hx, Hy) to the deduction queue Ti+1 corresponding to the Li+1 layer, wherein 1≤i<deep, and deep is the depth of the Merkle tree;

in a case where both the two nodes in the (Hx, Hy) are comprised in the deduction queue Ti corresponding to the Li layer, calculating a Hash value of the (Hx, Hy), and adding the Hash value of the (Hx, Hy) to the deduction queue Ti+1 corresponding to the Li+1 layer; and in a case where no node in the (Hx, Hy) layer is comprised in the deduction queue Tj corresponding to the Li layer, starting to traverse the next (Hx, Hy) layer.

4. The method for identity authentication according to claim 1, wherein the identity proof further comprises a verification code of the identity proof, and before acquiring the identity proof of the user, the method further comprises:

generating a graphical identity proof on the basis of the identity attribute selected by the user to be disclosed, wherein the verification code of the identity proof is displayed in the graphical identity proof; and acquiring an identity authentication result of the user by scanning the verification code in the graphical identity proof.

5. The method for identity authentication according to claim 1, wherein the identity proof further comprises: a digital identity (ID) of the user, and a signature made by the user on the identity proof using a private key of the user; after acquiring the identity proof of the user, the method further comprises:

acquiring a public key of the user from a block chain according to the digital identity ID of the user, and verifying the user signature by means of the public key of the user; and/or, the identity proof also comprises: a digital ID of an issuing institution of the identity proof, and an institution signature made by the issuing institution on the Merkle root by using a private key of the issuing institution; and after acquiring the identity proof of the user, the method further comprises:

acquiring the public key of the issuing institution from the block chain according to the digital ID of the issuing institution, and verifying the institution signature by means of the public key of the issuing institution.

6. The method for identity authentication according to claim 5, wherein authenticating the identity proof of the user according to the deduced verification path and a verification path in the identity proof comprises:

in a case where the deduced verification path is consistent with the verification path in the identity proof and the signature verification is passed, determining that the identity authentication of the user is passed, wherein the signature verification being passed comprises the signature verification of the user being passed, and/or the signature verification of the institution being passed.

7. The method for identity authentication according to claim 5, wherein acquiring a public key of the user from a block chain according to the digital ID of the user comprises:

acquiring a user profile according to the digital ID of the user, wherein the user profile is obtained according to identity registration information of the user when performing identity registration on the user, and the user profile is stored in a block chain;

acquiring the public key of the user from the block chain according to the user profile; and/or, acquiring the public key of the issuing institution from the block chain according to the digital (ID) of the issuing institution, comprising:

acquiring an issuing institution profile according to the digital (ID) of the issuing institution, wherein the issuing institution profile is obtained according to identity registration information of the issuing institution when performing identity registration on the issuing institution, and the issuing institution profile is stored in the block chain; and acquiring the public key of the issuing institution from the block chain according to the issuing institution profile.

8. An electronic device, comprising: at least one processor; and a memory in communication connection with the at least one processor, wherein the memory stores instructions which are executed by the at least one processor, and the instructions are executed by the at least one processor, so that the at least one processor executes the following operations:

acquiring an identity proof of a user, wherein the identity proof comprises an identity attribute of the user and a Merkle root verification path, and the Merkle root verification path in the identity proof is a verification path obtained when the identity proof is generated and based on an identity attribute selected by the user to be disclosed;

deducing the Merkle root verification path according to the disclosed identity attribute in the identity proof; and authenticating the identity proof of the user according to the deduced verification path and the verification path in the identity proof;

wherein the identity proof is generated in the following manner:

determining an identity credential issued to the user, wherein the identity proof comprises: all the identity attributes of the user, a Merkle root of all the identity attributes, and an institution signature made by the issuing institution of the identity credential on the Merkle root by using the private key of the issuing institution;

determining, among all the identity attributes in the identity credential, an identity attribute selected by the user to be disclosed;

obtaining the verification path according to the identity attribute selected by the user to be disclosed; and generating the identity proof according to the identity attribute selected by the user to be disclosed, the verification path and the institution signature, and signing the identity proof by using the private key of the user to obtain a user signature, so as to obtain an identity proof including the user signature.

9. A non-transitory computer readable storage medium, storing a computer program, wherein the computer program, when executed by a processor causes the processor to execute the following operations:

acquiring an identity proof of a user, wherein the identity proof comprises an identity attribute of the user and a Merkle root verification path, and the Merkle root verification path in the identity proof is a verification path obtained when the identity proof is generated and based on an identity attribute selected by the user to be disclosed;

deducing the Merkle root verification path according to the disclosed identity attribute in the identity proof; and authenticating the identity proof of the user according to the deduced verification path and the verification path in the identity proof;

wherein the identity proof is generated in the following manner:

determining an identity credential issued to the user, wherein the identity proof comprises: all the identity attributes of the user, a Merkle root of all the identity attributes, and an institution signature made by the issuing institution of the identity credential on the Merkle root by using the private key of the issuing institution;

determining, among all the identity attributes in the identity credential, an identity attribute selected by the user to be disclosed;

obtaining the verification path according to the identity attribute selected by the user to be disclosed; and generating the identity proof according to the identity attribute selected by the user to be disclosed, the verification path and the institution signature, and signing the identity proof by using the private key of the user to obtain a user signature, so as to obtain an identity proof including the user signature.

10. The method for identity authentication according to claim 1, wherein the identity proof comprises: an issuing institution of the identity proof, an ID of the issuing institution, an institution signature made by the issuing institution on the Merkle root by using a private key of the issuing institution, an issuing time, a signature made by the user on the identity proof using a private key, a signature algorithm used by the user for signature, and a two-dimensional verification code of an employment credential.

11. The method for identity authentication according to claim 10, wherein two-dimensional verification code of the employment credential comprises: a Uniform Resource Locator generated according to identity authentication and verification information.

12. The method for identity authentication according to claim 1, wherein the identity credential further includes: an institution ID of an issuing institution, an issuing time of the identity credential, a signature made on the identity credential by using a private key of the user, a signature algorithm used by the signature, and a verification code of an employment credential.

13. The electronic device according to claim 8, wherein deducing the Merkle root verification path according to the disclosed identity attribute in the identity proof comprises:

calculating, according to the disclosed identity attribute in the identity proof, a Hash value of the disclosed identity attribute in the identity proof; and deducing the Merkle root verification path according to the Hash value of the disclosed identity attribute and a constructed Merkle tree.

14. The electronic device according to claim 13, wherein deducing the Merkle root verification path according to the Hash value of the disclosed identity attribute and a constructed Merkle tree comprises:

determining, in an L1 layer of the Merkle tree, a node corresponding to the Hash value of the disclosed identity attribute, and adding the node to a deduction queue T1 corresponding to the L1 layer;

deducing from the bottom up of the Merkle tree, sequentially traversing paired nodes (Hx, Hy) of each layer, and after the paired nodes (Hx, Hy) of each layer have been traversed, performing deduction to obtain the Merkle root verification path, wherein the following operations are executed on the traversed the paired nodes (Hx, Hy) in the Li layer:

in a case where one node in the (Hx, Hy) is comprised in the deduction queue Ti corresponding to the Li layer, adding the Hash value of another node in the (Hx, Hy) to the verification path, calculating the Hash value of the (Hx, Hy), and adding the Hash value of the (Hx, Hy) to the deduction queue Ti+1 corresponding to the Li+1 layer, wherein $1 \leq i < deep$, and deep is the depth of the Merkle tree;

in a case where both the two nodes in the (Hx, Hy) are comprised in the deduction queue Ti corresponding to the Li layer, calculating a Hash value of the (Hx, Hy), and adding the Hash value of the (Hx, Hy) to the deduction queue Ti+1 corresponding to the Li+1 layer; and in a case where no node in the (Hx, Hy) layer is comprised in the deduction queue Tj corresponding to the Li layer, starting to traverse the next (Hx, Hy) layer.

15. The electronic device according to claim 8, wherein the identity proof further comprises a verification code of the identity proof, and before acquiring the identity proof of the user, the method further comprises:

generating a graphical identity proof on the basis of the identity attribute selected by the user to be disclosed, wherein the verification code of the identity proof is displayed in the graphical identity proof; and acquiring an identity authentication result of the user by scanning the verification code in the graphical identity proof.

16. The electronic device according to claim 8, wherein the identity proof further comprises: a digital identity (ID) of the user, and a signature made by the user on the identity proof using a private key of the user; after acquiring the identity proof of the user, the method further comprises:

acquiring a public key of the user from a block chain according to the digital identity ID of the user, and verifying the user signature by means of the public key of the user; and/or, the identity proof also comprises: a digital ID of an issuing institution of the identity proof, and an institution signature made by the issuing institution on the Merkle root by using a private key of the issuing institution; and after acquiring the identity proof of the user, the method further comprises:

acquiring the public key of the issuing institution from the block chain according to the digital ID of the issuing institution, and verifying the institution signature by means of the public key of the issuing institution.

17. The electronic device according to claim 16, wherein authenticating the identity proof of the user according to the deduced verification path and a verification path in the identity proof comprises:

in a case where the deduced verification path is consistent with the verification path in the identity proof and the signature verification is passed, determining that the identity authentication of the user is passed, wherein the signature verification being passed comprises the signature verification of the user being passed, and/or the signature verification of the institution being passed.

18. The electronic device according to claim 16, wherein acquiring a public key of the user from a block chain according to the digital ID of the user comprises:

acquiring a user profile according to the digital ID of the user, wherein the user profile is obtained according to identity registration information of the user when performing identity registration on the user, and the user profile is stored in a block chain;

acquiring the public key of the user from the block chain according to the user profile; and/or, acquiring the public key of the issuing institution from the block chain according to the digital (ID) of the issuing institution, comprising:

acquiring an issuing institution profile according to the digital (ID) of the issuing institution, wherein the issuing institution profile is obtained according to identity registration information of the issuing institution when performing identity registration on the issuing institution, and the issuing institution profile is stored in the block chain; and acquiring the public key of the issuing institution from the block chain according to the issuing institution profile.

* * * * *